(No Model.)
W. BIDDLE & P. KENNEDY.
MODE OF CONNECTING DYNAMOS TO CAR AXLES.
No. 517,997. Patented Apr. 10, 1894.
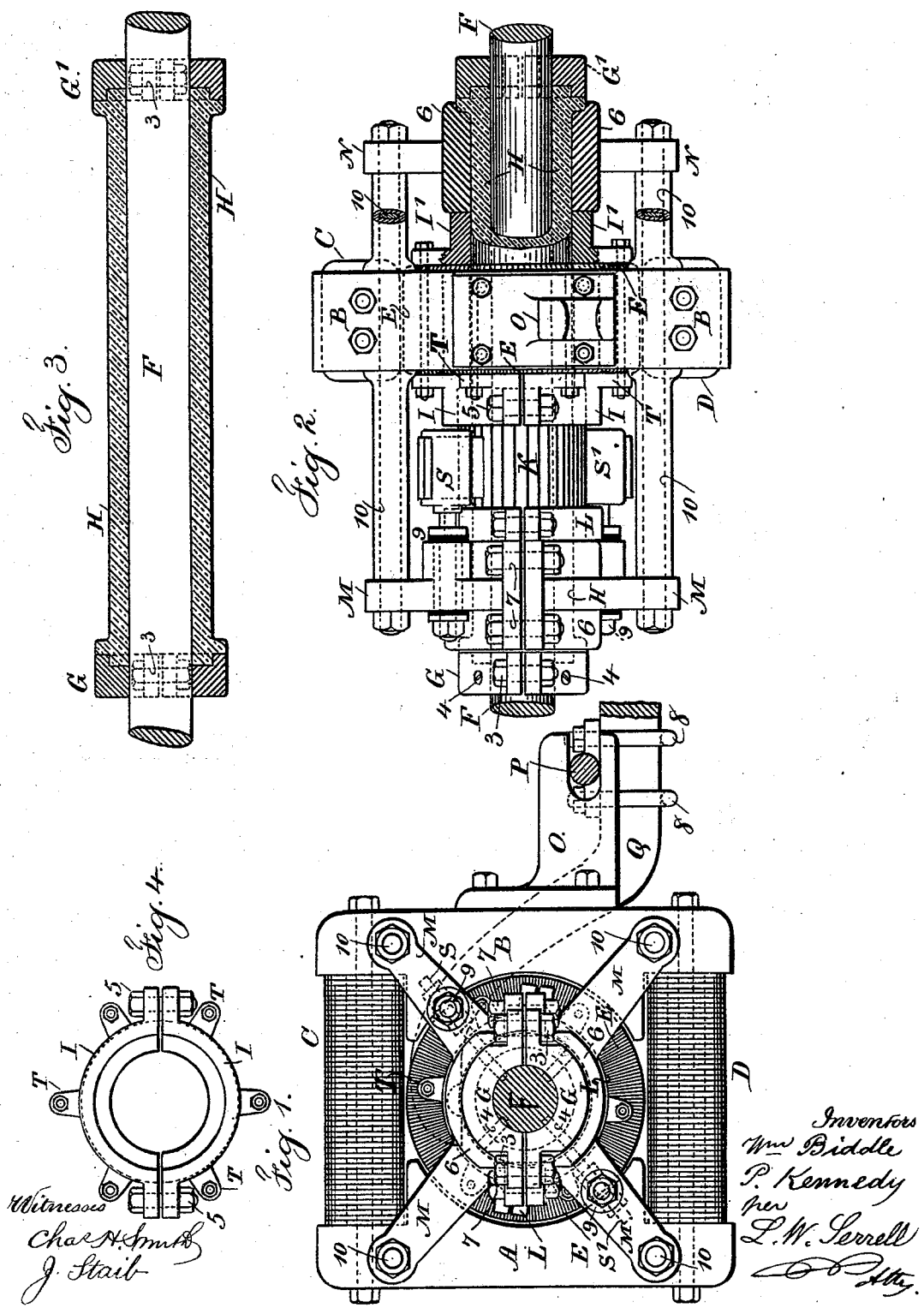

UNITED STATES PATENT OFFICE.

WILLIAM BIDDLE AND PATRICK KENNEDY, OF BROOKLYN, ASSIGNORS TO THE AMERICAN RAILWAY ELECTRIC LIGHT COMPANY, OF NEW YORK, N. Y.

MODE OF CONNECTING DYNAMOS TO CAR-AXLES.

SPECIFICATION forming part of Letters Patent No. 517,997, dated April 10, 1894.

Application filed July 3, 1893. Serial No. 479,494. (No model.)

*To all whom it may concern:*

Be it known that we, WILLIAM BIDDLE and PATRICK KENNEDY, citizens of the United States, residing at Brooklyn, in the county of Kings and State of New York, have invented an Improvement in Electric Car-Lighting Apparatus, of which the following is a specification.

The present invention is made with special reference to the connecting of the dynamo with one of the axles of the car so as to drive the armature directly by the axle and for supporting the field magnets and frame, so that they will not rotate with the axle and armature but so that there will be but little strain tending to bend the frame or displace the field magnets in their relation to the armature, hence the dynamo will be supported directly by one pair of wheels and only subjected to the concussion necessarily incident to the traveling of the wheels upon the track.

In the drawings, Figure 1 is a section of the axle and an elevation of the dynamo. Fig. 2 is a side view of the dynamo with the bearing in section at one side of the armature. Fig. 3 is a section of the sleeve upon the axle. Fig. 4 is a detached view of the armature holder.

The pole pieces A B are united by cores with helices C D so as to form an open frame for the reception of the armature E which is supported upon and directly connected with the axle F.

There is nothing peculiar in the construction of the field magnets or in the winding of the armature, but it will be apparent that in consequence of the armature being directly connected to the axle the frame supporting the field magnets must receive its support also from the axle and that the axle must rotate in bearings or boxes that support the frame and field magnets of the dynamo. With this object in view the axle is provided for the reception of the other parts by applying to the surface thereof at suitable distances apart the clamping rings G G' which are preferably made as half rings with flanges for the clamping bolts 3, and the screws or bolts 4 pass through the respective clamping rings and their ends enter recesses in the axle F, so that the rings may be firmly and reliably connected with the axle, and should there be any inaccuracy in the axle itself, the rings are to be adjusted by these screws 3 so that the exterior surfaces of the rings G G' are concentric to the axis of rotation, and we apply around the axle a mold that is guided by the rings G G', and into this mold the sleeve H of Babbitt metal or similar material is cast, so that the same forms a reliable bearing surface for centering the armature and for the frame carrying the field magnets. Around the sleeve H are firmly clamped the end frames I I' of the armature. These frames are preferably in the form of divided rings provided with clamping bolts 5 by which such end armature frames are firmly clamped upon the sleeve H of Babbitt metal or similar material, so that these end frames are held properly in position by the clamping action and they also serve to confine the Babbitt metal firmly upon the axle, and the projecting arms T of the frames I I' are adapted to receive and support the armature, the connections between the arms and the armature being of any desired character, and the armature is cylindrical and rotates by and with the axle F and between the poles A and B of the field magnets, and at one end of the armature and outside the end frame I is the commutator formed with bars K which are confined in position at their outer ends by the clamping ring L and the commutator bars are to be of any desired character. The frames M N serve for supporting the field magnets upon the sleeve H, and such sleeve and the axle rotate within the bearings 6 of such frames M N, and these bearings 6 are made in halves so as to be easily applied around the sleeve H and held in position by the bolts 7 that pass through the flanges of the bearings 6, and by which said bearings can be set up more or less tightly upon the sleeve H, and the frames and field magnets are connected by the bolts 10.

We provide on one side of the dynamo a projecting bracket or arm O which is preferably slotted and receives through the slot the cross bar P, the ends of which rest upon and are connected with the equalizing levers Q that are provided in ordinary trucks and extend from the axle boxes of one pair of wheels to the axle boxes of the adjacent pair of wheels, and such equalizing levers may be of any desired character and only one end of such equalizing lever is represented on the drawings, it being understood that there is a second equalizing lever and that the ends of the cross bar P are clamped thereto by suitable clips or bolts 8. It will now be apparent that the cross bar P holds the field magnets and frames of the dynamo from rotating and that no movement can be given of the field magnets in relation to the armature except the slight vibration which may result from the travel of the wheels upon the railway track and that the armature is to be rotated by and with the axle F.

The electric connections for the lights upon the car or railway train are not represented in the drawings, but at S S' the commutator brushes and their supports are represented, the support being derived from the connection with the frame of the dynamo, as seen at 9, and these connections that support the brushes of the commutator are preferably insulated, as indicated, and the electric circuit connections are provided in the ordinary manner, and it is advantageous to employ a storage battery and the electric lamps in multiple arc in connection with the present dynamo and with a suitable switch.

By having the bracket arm O slotted for the reception of the cross bar that is connected with the equalizing levers, we are enabled to connect or disconnect the parts of the dynamo from the cross bar P in putting the parts together or in separating them as may be required from time to time.

We claim as our invention—

1. The combination with the car wheel axle, of the divided rings G G' clamped upon the axle, a sleeve of metal between the said rings cast around the axle, an armature surrounding the axle and armature rings in halves at the ends of the armature, screws for clamping the same to the sleeve, the field magnets at opposite sides of the armature, the supporting frames for the same and half circle bearings surrounding the sleeve upon the axle and the bolts for connecting the half circle bearings, substantially as set forth.

2. The combination with the car wheel axle, of the divided rings G G' clamped upon the axle, a sleeve of metal between the said rings cast around the axle, an armature surrounding the axle and armature rings in halves at the ends of the armature, screws for clamping the same to the sleeve, the field magnets at opposite sides of the armature, the supporting frames for the same and half circle bearings surrounding the sleeve upon the axle, the bolts for connecting the half circle bearings, a slotted bracket extending out at one side of the dynamo, the equalizing levers for the truck, and a cross bar connected at its ends with the equalizing levers and passing through a slot in the bracket, substantially as set forth.

3. The combination with the car wheel axle, of the divided rings G G' clamped upon the axle, a sleeve of metal between the said rings cast around the axle, an armature surrounding the axle and armature rings in halves at the ends of the armature, screws for clamping the same to the sleeve, the field magnets at opposite sides of the armature, the supporting frames for the same and half circle bearings surrounding the sleeve upon the axle, the bolts for connecting the half circle bearings, commutator plates at one end of the armature, the clamping ring for the outer ends of the commutator plates and by which they are held to the sleeve, and commutator brushes supported by the frames of the dynamo, substantially as set forth.

Signed by us this 30th day of June, 1893.

WILLIAM BIDDLE.
PATRICK KENNEDY.

Witnesses:
GEO. T. PINCKNEY,
A. M. OLIVER.